United States Patent [19]

Jones

[11] Patent Number: 4,815,864
[45] Date of Patent: Mar. 28, 1989

[54] ADJUSTABLE TENSION FOIL BEARING

[75] Inventor: Allen M. Jones, Novi, Mich.

[73] Assignee: Williams International Corporation, Walled Lake, Mich.

[21] Appl. No.: 200,249

[22] Filed: May 31, 1988

[51] Int. Cl.⁴ .......................... F16C 32/06; F16C 23/02
[52] U.S. Cl. ..................................... 384/103; 384/104; 384/253
[58] Field of Search .................................. 384/100–124, 384/247, 253, 261, 263

[56] References Cited

U.S. PATENT DOCUMENTS

| | | | |
|---|---|---|---|
| 3,434,761 | 3/1969 | Marley | 384/103 |
| 3,506,314 | 4/1070 | Gross et al. | 384/104 |
| 3,520,578 | 7/1970 | Licht | 384/104 |
| 4,445,792 | 5/1984 | Trippett | 384/103 |

Primary Examiner—Stuart S. Levy
Assistant Examiner—Thomas R. Hannon
Attorney, Agent, or Firm—Lyman R. Lyon

[57] ABSTRACT

An adjustable tension foil bearing for a rotatable shaft comprises a bearing housing for the support of a plurality of foil carriers which carry a like plurality of foil elements. The foil carriers are rotatable to effect tensioning of the foil elements.

2 Claims, 1 Drawing Sheet

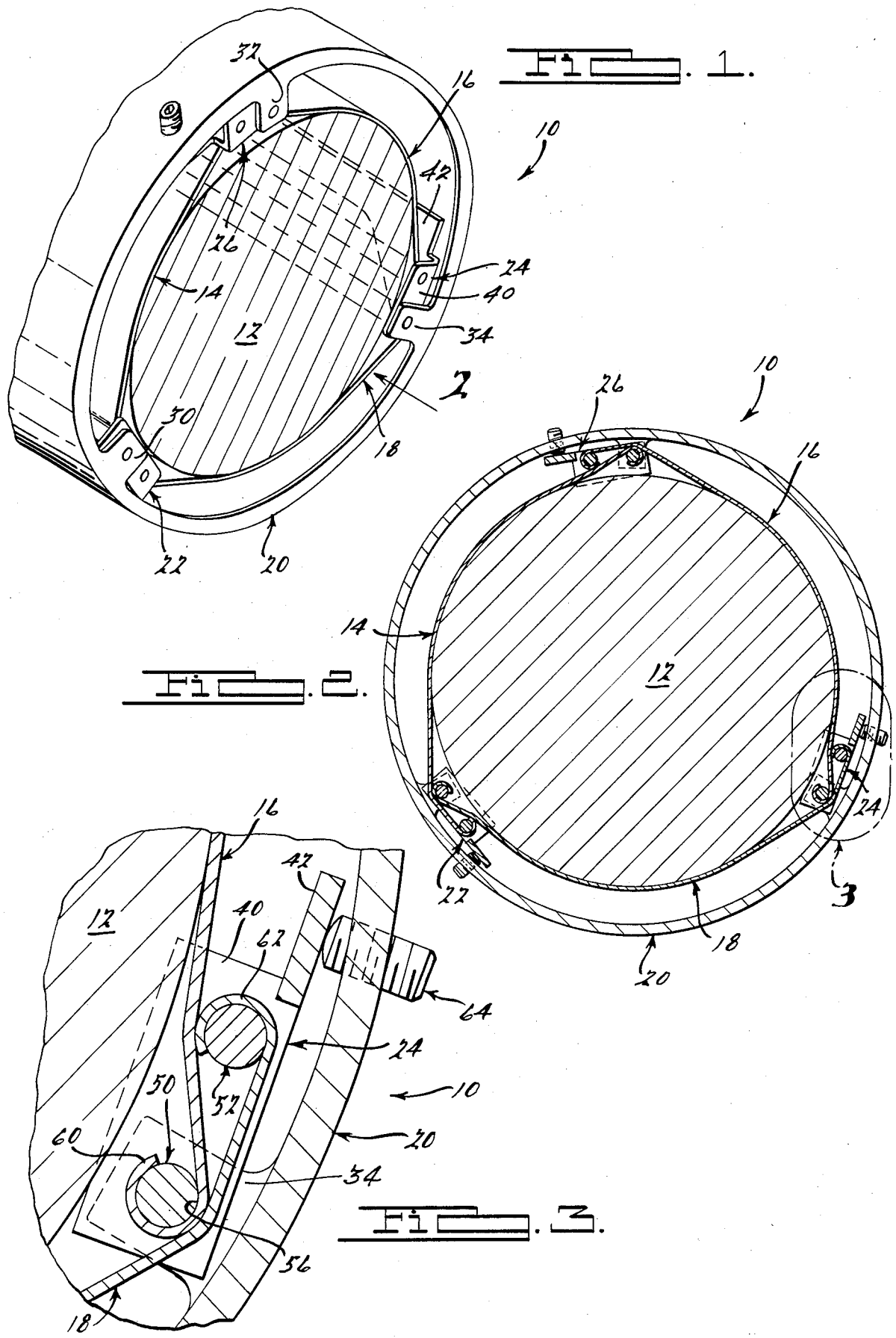

ADJUSTABLE TENSION FOIL BEARING

BACKGROUND OF THE INVENTION

Compliant hydrodynamic gas bearings are subjected to two principal types of instability, the first of which is known as "synchronous whirl" and the second of which is known as "half-speed whirl". During relatively low-speed rotation of a shaft, the orbiting motion of the geometric center of the shaft about the geometric center of the bearing support tends to set up centrifugal forces acting on the shaft which cause the shaft to orbit or whirl at a rotational speed equal to the rotational speed of the shaft about its own axis. This orbiting or whirling motion is synchronous whirl and occurs at the lowest critical speed of the bearing.

Half-speed whirl is a more serious instability which occurs as the shaft approaches a speed approximately equal to twice its lowest critical speed. At twice critical speed the shaft inherently tends to undergo harmonic vibration at its lowest critical frequency. This harmonic vibration is superimposed upon the synchronous whirl and is stimulated or excited by the load-carrying rotating fluid-wedge whose average velocity about the shaft now approaches the lowest critical speed. As a result, orbital excursions of the shaft rapidly increase in amplitude. During half-speed whirl the whirl velocity of the shaft approximates the average velocity of the fluid-wedge. When this occurs the speed of the fluid-wedge relative to the orbiting shaft tends toward zero, causing a loss of fluid-film support. Since the shaft is operating at a relatively high speed, contact between the shaft and bearing may cause damage or failure of the bearing.

The aforesaid problem has heretofore been addressed by selection of a spring rate for the foil support system that minimizes the problem by altering the shape of the fluid-film to maintain stability and location of the mounted shaft group. No provision was made for controlled adjustment of shaft location and/or adjustment of foil spring rate.

SUMMARY OF THE INVENTION

The adjustable tension foil air bearing of the instant invention comprises a plurality of foil carriers which locate and retain a like plurality of bearing foils. A foil extends between a pivot center axle on one foil carrier and a foil tension axle on a circumferentially spaced foil carrier. The ends of each foil are attached to the pivot axles and tension axles of the next adjacent carrier by a simple overlapping pressure retention system. The foil carriers are individually adjustable thereby to adjust shaft position and modify the spring rate of the foils connected thereto.

BRIEF DESCRIPTION OF THE DRAWINGS

FIG. 1 is a perspective view, partially in section, of an adjustable tension foil bearing in accordance with the instant invention;

FIG. 2 is a view taken in the direction of the arrow "2" of FIG. 1, and

FIG. 3 is a view taken within the circle "3" of FIG. 2.

DETAILED DESCRIPTION OF THE PREFERRED EMBODIMENT OF THE INVENTION

Referring to FIG. 1 of the drawings, an adjustable tension foil bearing 10 in accordance with a preferred embodiment of the present invention is adapted to be disposed about a shaft 12. A plurality of flexible tensioned compliant foils 14, 16 and 18 are supported in radially inwardly spaced relation to a bearing housing 20 by a plurality of foil carriers 22, 24 and 26. The foil carriers 22, 24 and 26 are supported in the bearing housing 20 by a plurality of radially inwardly extending carrier support flanges 30, 32 and 34. Similar flanges, 30, 32, and 34, (not shown) are provided at the opposite end of the housing 20.

As best seen in FIG. 3 of the drawing, the foil carrier 24, which is exemplary of the carriers 22 and 26, comprises a pair of axially spaced circumferentially and radially extending flange portions 40, one of which is shown, connected by an axially and circumferentially extending flange 42. The flange portions 40 of the foil carrier 24 are journaled on a pivot axle 50 and support a tension axle 52. The pivot axle 50 extends through complementary apertures 56 in the axially spaced radially inwardly extending flanges 34 in the housing 20. The tension axle 52 is supported solely by the axially spaced flanges 40 on the carrier 24 for rotation therewith about the pivot axle 50.

An end portion 60 of the foil 16 is wrapped about the pivot axle 50 and is mechanically locked thereagainst by the foil 18 which, in turn, has an end portion 62 wrapped about the tension axle 52 and under the foil 16. Upon rotation of the carrier 24 counterclockwise, as seen in FIG. 3, under the bias of an adjustment screw 64, the aforesaid geometry results in tensioning of the foil 16. Thus, each of the foils 14, 16 and 18 can be individually tensioned to control the spring rate thereof by advancement or retraction of its complementary adjusting screw 64. Like adjustment of the tension in all three foils 14, 16 and 18 maintains the center of rotation of the shaft 20 but modifies the load-carrying capability thereof. Selective adjustment of the carriers 22, 24 or 26 can be used to effect shifting of the center of rotation of the shaft 12 to a desired position to accommodate or minimize swirl.

Replacement of the foils 14, 16 and 18 is readily accomplished by merely removing a foil from its retained position about a pivot axle 50 and the next adjacent tension axle 52.

From the foregoing it should be apparent that the adjustable support system for the foil elements 14, 16 and 18 serves multiple functions. The system provides adjustable localized control of foil stiffness to prevent unwanted undulations in the hydrodynamic fluid-film surface that would decrease the load carrying capacity of the bearing. The adjustable carriers provide such stiffness control in combination with shaft positioning. Thus, the support system optimizes (a) hydrodynamic fluid-film and load-carrying capacity of the bearing 10, (b) enhances bearing damping capability, (c) provides for staged increase in stiffness with increasing load on the foils 14, 16, and 18, (d) inherently controls distortions along the foils 14, 16, and 18 in the axial direction, and (e) has the capability to adjust for misalignment between the foils 14, 16 and 18 and the shaft 12.

In operation, rotation of the shaft 12 relative to the bearing housing 20 induces the formation of a boundary layer of air or other gas in a converging wedge-shaped gap between the shaft surface and the surface of the foil elements 14, 16, and 18. The converging wedge-shaped gaps are inherently formed due to hydrodynamic induction of the gas under the foil elements.

The foil elements 14, 16, and 18 accommodate both radial and longitudinal deflection thereof in accordance with the pressure profile of the hydrodynamic gas film so as to provide maximum load-carrying capacity, to tolerate bearing misalignments and skew loads, and to tolerate axial thermal distortions. Load carrying capacity is further enhanced by the geometry of the foil carriers 22, 24, and 26 which provide an initial relatively low tension on the elements 14, 16, and 18 that becomes progressively stiffer as the shaft 12 moves in the radial direction.

Under misaligned or skewed load conditions, substantial deflections of one edge of the bearing assembly 10 may occur in a direction parallel the axis of the shaft 12. Lateral deflections in the form of relative misalignment between the shaft 12 and the stationary bearing housing 20 are compensated by tension in the foil elements. Adjustment of the spring constant of the foils 14, 16, and 18 provides a means to tailor resistance to lateral deflection of the shaft 12 thereby to tolerate bearing misalignment and skew loads while the clearance space between the shaft 12 and the foil elements 14, 16, and 18 remains substantially uniform across the journal surface of the shaft 12 within the constraints imposed by the pressure profile of the hydrodynamic gas fluid-film. Another desirable feature is that the pressure profile across the foil 24 is relatively uniform since the bearing clearance is relatively uniform, thereby minimizing any reduction in load capacity of the bearing due to swirl.

In addition, heat generated in the fluid-film is transferred to the foil 24 relatively uniformly from edge to edge as opposed to the situation in heretofore known foil air bearings where the clearance is greater at one edge than the other. Uniformity of heat generation in the foil 24 prevents localized heat distortion thereof which otherwise could cause the foil 24 to expand in the area of smallest clearance and become tapered or barrel-shaped so as to contact the shaft with consequent damage to the bearing 10.

While the preferred embodiment of the invention has been disclosed, it should be appreciated that the invention is susceptible of modification without departing from the scope of the following claims.

I claim:

1. An adjustable tension foil bearing for a rotatable shaft comprising
   a bearing housing,
   a plurality of foil carriers mounted on said housing for rotation about axes extending parallel to the axis of said rotatable shaft, and
   a plurality of foil elements disposed about the periphery of said shaft, opposite ends of each of said foil elements being secured to adjacent foil carriers whereby rotations thereof effects tensioning of said foil elements.

2. A bearing in accordance with claim 1 wherein each of said foil carriers is mounted for rotation on a pivot axle and carries a circumferentially spaced tension axle, opposite ends of each foil element being secured to the pivot axle of one foil carrier and the tension axle of an adjacent foil carrier.

* * * * *